United States Patent [19]

Hurliman et al.

[11] 4,182,420
[45] Jan. 8, 1980

[54] ROOT CROP HARVESTER AND TRIMMER

[75] Inventors: Russell J. Hurliman, Hoopeston; Frank F. Scribner, Batavia, both of Ill.

[73] Assignee: FMC Corporation, San Jose, Calif.

[21] Appl. No.: 871,300

[22] Filed: Jan. 23, 1978

[51] Int. Cl.² ............................................. A01D 27/04
[52] U.S. Cl. .......................................... 171/38; 171/61
[58] Field of Search ....................... 171/61, 55, 26, 32, 171/37, 38

[56] References Cited
U.S. PATENT DOCUMENTS

| | | | |
|---|---|---|---|
| 1,075,440 | 10/1913 | Ramsey | 171/38 |
| 1,185,785 | 6/1916 | Ferguson | 171/61 |
| 2,854,083 | 9/1958 | Wetzel | 171/61 |
| 3,366,184 | 1/1968 | Hawkins et al. | 171/61 |

Primary Examiner—Russell R. Kinsey
Attorney, Agent, or Firm—John F. Verhoeven

[57] ABSTRACT

A harvester and trimmer for carrots, which can also be used on root crops such as red beets, turnips, parsnips and rutabaga, embodies a wheeled vehicle having a conventional plowshare and an upwardly and rearwardly extending harvesting frame. The harvesting frame mounts opposed endless harvesting or lifter belts having adjacent reaches for grasping and lifting the tops of the plants. A pair of laterally opposed gauging belts is disposed above a downstream portion of the lifter belts and these belts are upwardly and rearwardly inclined from the lifter belts at an acute angle of about 6-7 degrees for independently grasping the tops to pull the tops up through the underlying lifter belts, bringing the crowns of the roots against the lifter belts. The gauging belts are driven at a linear speed that is about 7% slower than that of the lifter belts so that the latter swing the roots rearwardly until their axes are substantially normal to the lifter belts, whereupon trimming knives trim off small upper portions of the roots in a plane parallel to the plane of the lifter belts and perpendicular to the axes of the roots. The gauging belt idlers exert a stronger force on the tops than the lifter belt idlers so that the gauging belts can pull the crowns into engagement with the lifter belts.

7 Claims, 7 Drawing Figures

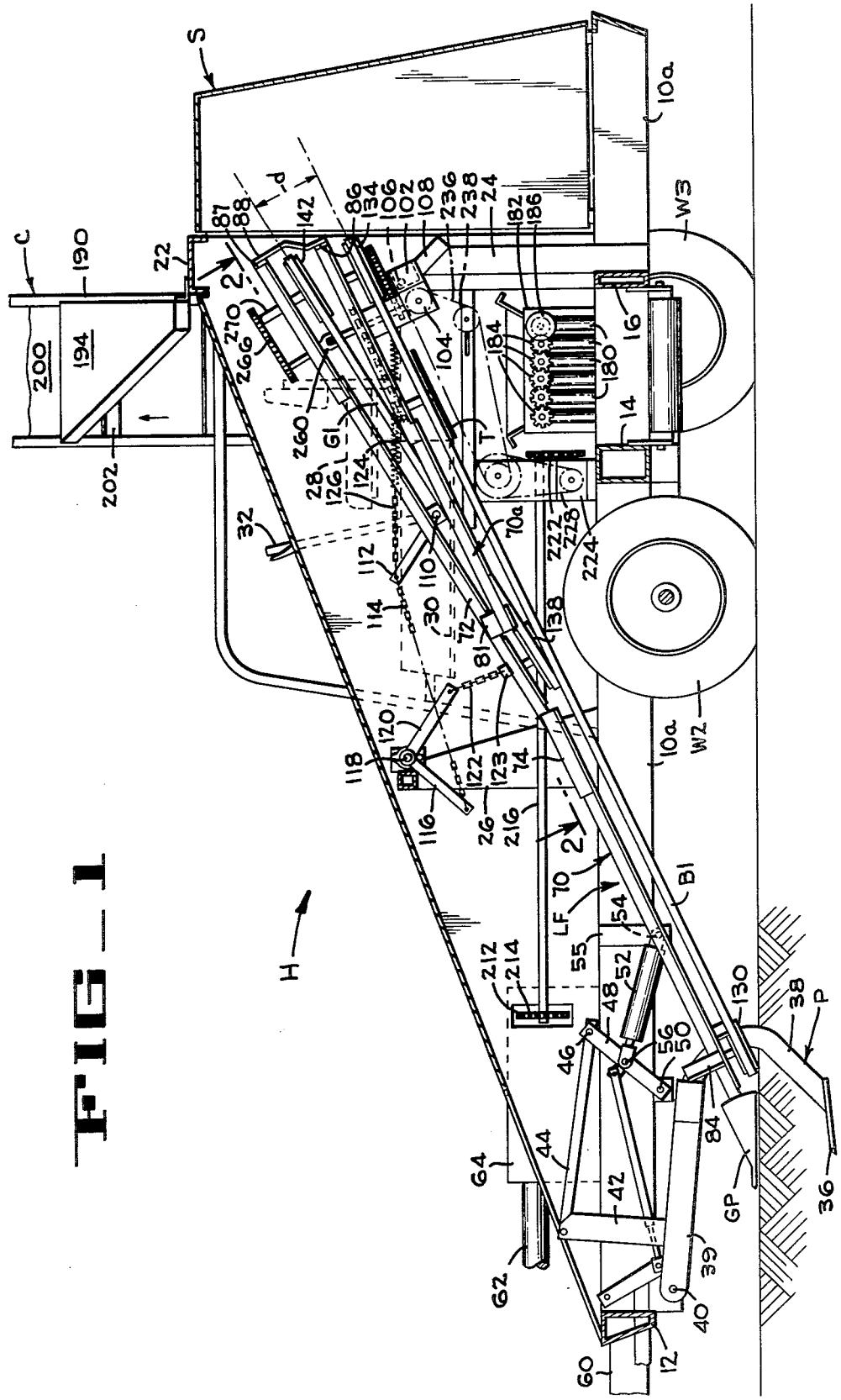
FIG_1

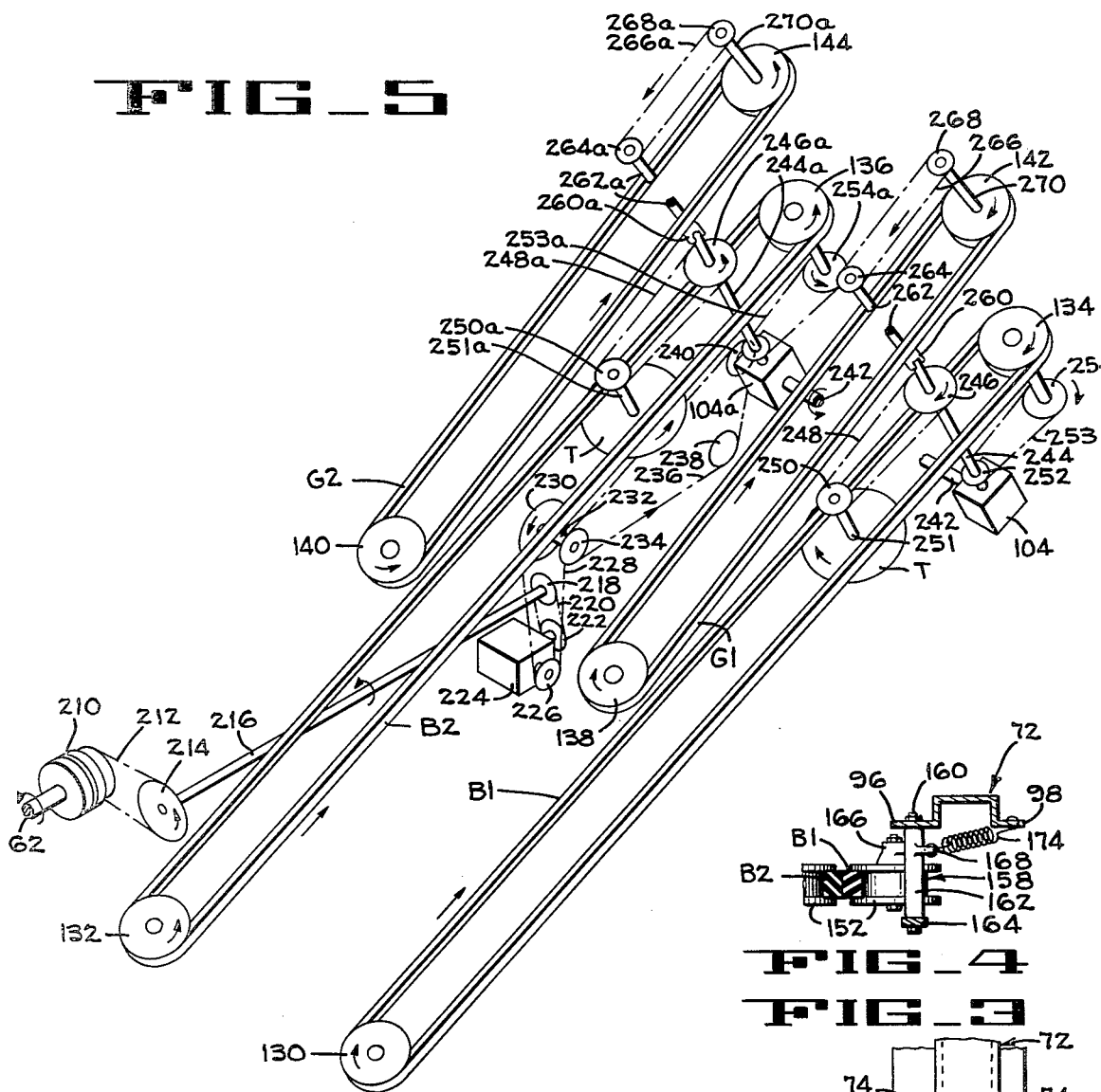

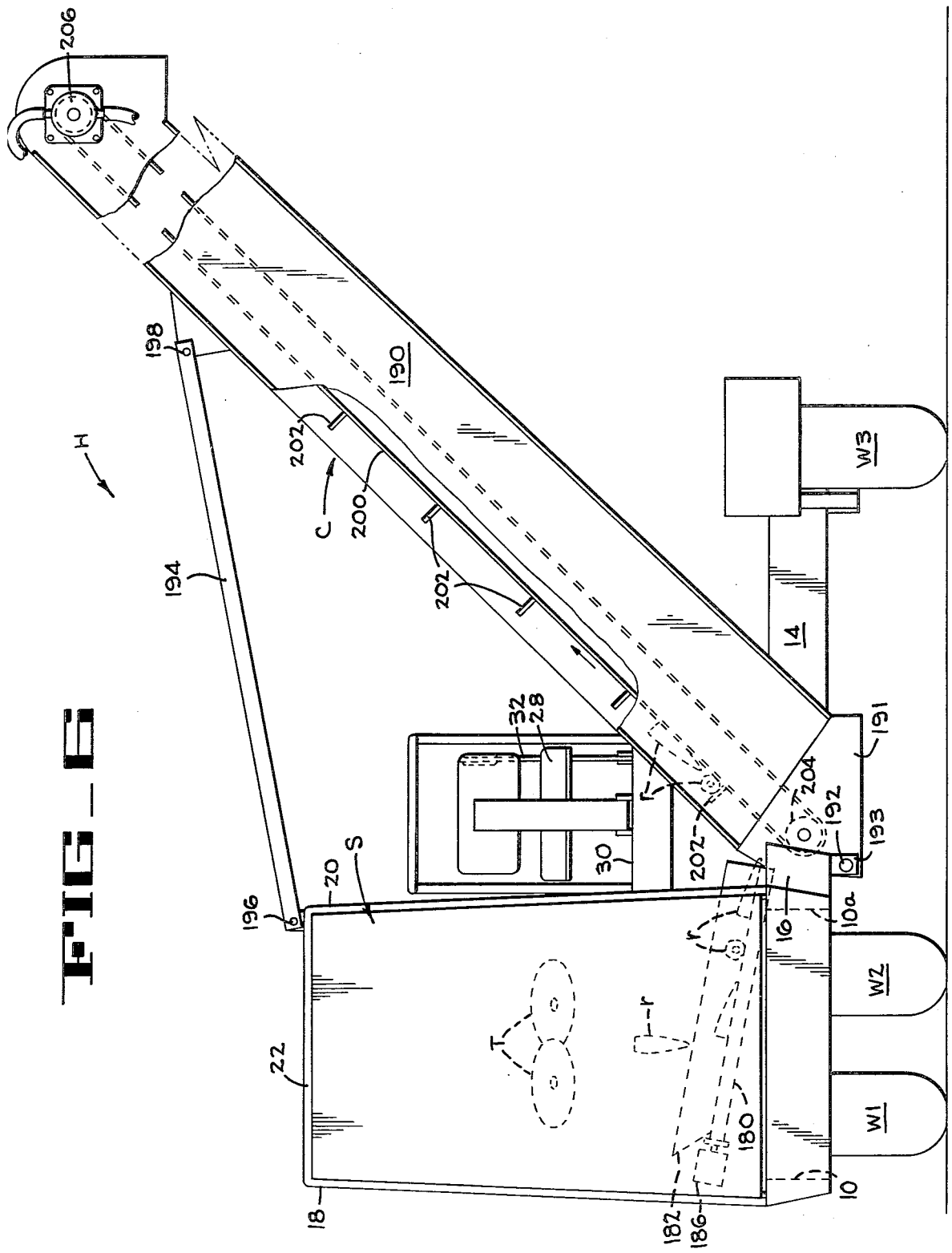

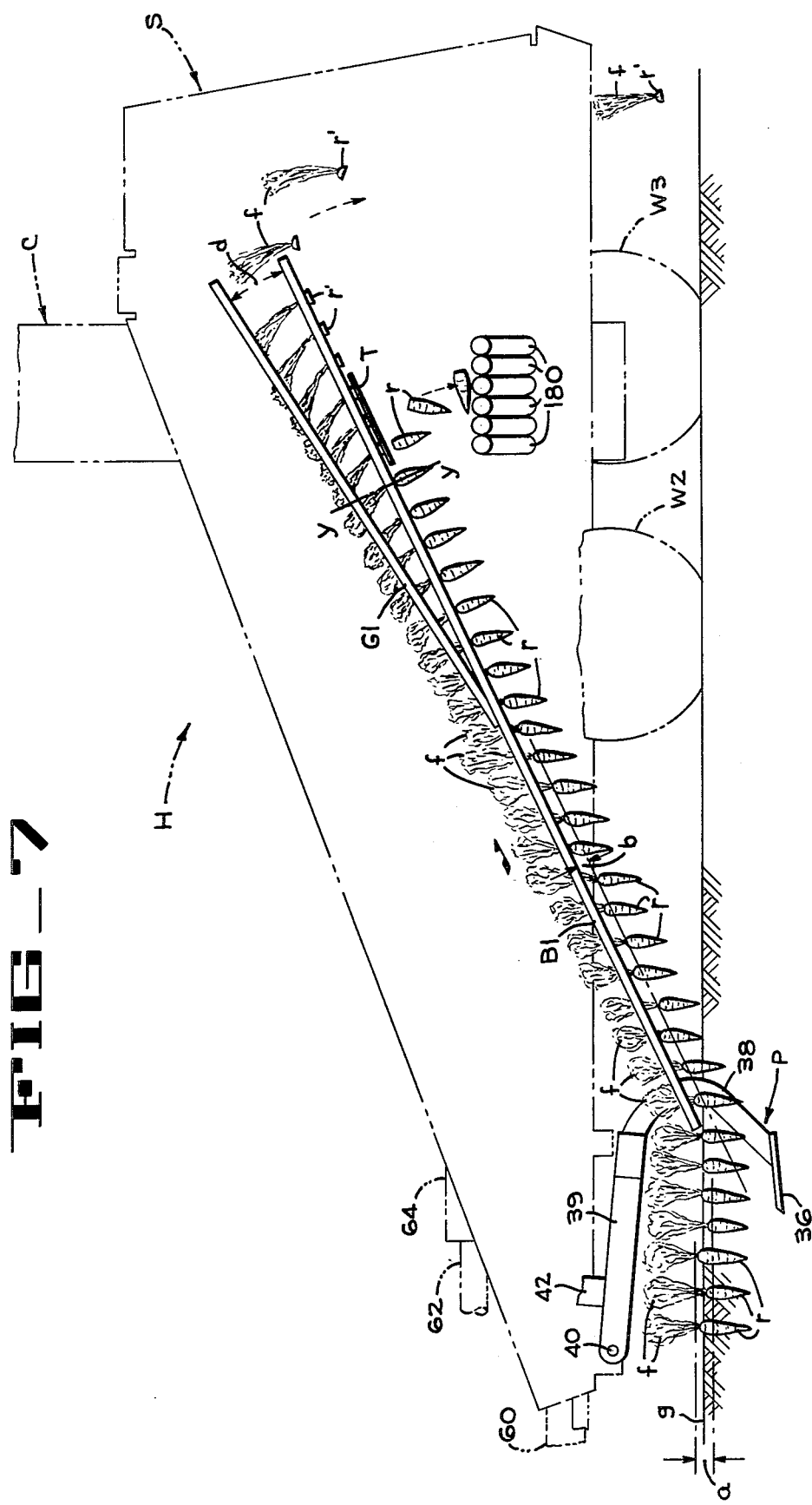

ROOT CROP HARVESTER AND TRIMMER

FIELD OF THE INVENTION

This invention relates to harvesters and more particularly to harvesters for root crops such as carrots, beets and turnips or the like, with means for gauging and trimming the harvested roots.

DESCRIPTION OF PRIOR ART

The U.S. Pat. No. 2,436,594, to Nicholoy, issued Feb. 24, 1948, discloses a root harvester (specifically mentioning beets) having a pair of upwardly inclined chains 32 with opposed upwardly running top or foliage gripping reaches for lifting the roots from the ground after the soil has been loosened by a plow. The beet tops are severed from the beets by rotating sets of severing or topping bars adjacent the delivery end of the harvesting chains. The prior art shows a number of harvesters of this types for beets, carrots, etc., and they all leave small ends of the foliage or tops on the crowns of each root, which must be trimmed off later.

The root crop harvester of the Marshal U.S. Pat. No. 3,547,878, issued Apr. 3, 1951, employs opposed spirally ribbed rollers 4 for lifting the roots by their tops and bringing the roots to disc cutters 50 which are parallel to the spiral rollers.

The U.S. Pat. No. 2,589,361 to Floeter et al., issued Mar. 18, 1952, discloses a beet harvester wherein conveyor chain 74 and V-belt 78 convey the tops and drag the beets between positioner bars 133 (Col. 8, FIGS. 9 and 10). The positioner bars are intended to engage opposite sides of the beet and draw the beet downwardly so that the beet will be severed slightly below the crown. It is not seen wherein this action is precise or reliable. Also, there is no assurance that drag on the beets by the bars 133 will not destroy the perpendicularity of the roots (being advanced by 74,78) to the knives 121, thereby resulting in slant cuts and loss of yield.

The U.S. Pat. No. 2,693,069, to Krier, issued Nov. 2, 1954, discloses a beet harvesting and topping device having an upwardly inclined harvesting frame, a plow and top lifter belts 22 on the frame with opposed upwardly running reaches that grip the tops or foliage. Horizontally opposed gauging rods 24 are mounted below an upper portion of the lifter belts and the lifter belts pull on the tops to bring the roots against the gauging rods, whereupon the top portions of the roots are cut off by opposed trimmer knives 45. The gauge rods 24 are spring loaded inwardly to engage the crowns and large beets can tilt the rear ends of the guide rods upwardly in their mounting, thereby lifting the roots relative to the knives 45 (Col. 2, lines 70-75). This will cause a yield loss. Also, the frictional force exerted by the rods 24 on the crowns will vary with crown size so that the precise vertical orientation of the roots shown in FIG. 1 will not be maintained in field operation, resulting in slant cuts and yield loss.

The beet harvester of U.S. Pat. No. 2,476,366 Urschel employs four pairs of staggered discs 132 for precisely positioning the beets relative to the trimming knives. This requires a complex and expensive shaft, universal joint and double chain drive system (chains 129 and 163, FIGS. 1 and 9) for the positioning discs 132.

SUMMARY OF THE INVENTION

The present invention will be described in connection with a carrot harvester although it is useful for the harvesting of other root crops such as red beets, turnips, parsnips and rutabaga. The harvester of the present invention has particular utility as a harvester for root crops for canneries in that it cuts off a small slice of the crown of the root along with the attached top (foliage), thereby eliminating trimming at the cannery. It is a feature of the invention that all lifting and gauging are performed by paired endless belts and that the slices of the roots that are trimmed off and discarded with the tops are of uniformly small size and the trim line is normal to the root axis, thereby maximizing the yield.

Root crops, such as carrots, grow with the crowns of the roots at uneven distances relative to the surface of the ground. In some cases the crowns may be well below the ground, while in others they may be at the ground surface or even projecting slightly above the surface. Thus, prior trimming harvesters employing a pair of upwardly inclined harvesting or lifter belts and a gauging system that intersects the lifter belts and is disposed below the latter, such as the gauging bars of the aforesaid Krier and Floeter et al. patents and the gauge discs of Urschel U.S. Pat. No. 2,476,336, may provide interference or misalignment of the root relative to the knives at the transfer zone of the roots from their condition of hanging freely down from the lifter belts to the condition wherein the roots are pulled back along and under the gauging bars by the lifter belts acting on the tops (foliage).

Interference and misalignment at the transfer zone in prior harvesters occurs due to the aforesaid uneven disposition of the crowns of the crop roots relative to the ground at the time of harvesting. For example, in cases wherein the crowns of roots are at or above ground level (high roots), the crowns of the high roots are initially disposed against or closely adjacent to the lifter belts when the plow's loosened roots are pulled from the ground. When they reach the transfer zone, such high roots may strike the forward ends of lower mounted gauging bars or the like of the prior art and be caught there as the harvesting belts continue to advance the tops. This necessitates stopping the machine and cleaning it out. If such high roots are pulled through the gauging bars by the lifter belts, the trimming knives, which are just below the gauge bars, will leave a substantial top portion of the root attached to the foliage, causing a yield loss.

The aforesaid problem is particularly troublesome in fields where the tops, foliage or leaves of the plants are short, requiring that the lifter belts be adjusted to grip the tops as close to the ground as possible, so that after the crop passes the transfer zone, the prior gauging bars (which are below the belts and diverge therefrom) will not pull the tops free of the lifter belts. For example, the harvester of the Krier patent (owned by the FMC Corporation), requires adjustment mechanism for the gauge bars to operate under these conditions. In the present invention, the gauging structure is disposed above the lifter belts and the trimmer knife structure is mounted beneath the lifter belts in a fixed position, parallel to and closely adjacent to the lifter belts. Therefore, the obstruction problems between the roots and the gauging structure, referred to previously, are not present, and the knives always trim off uniformly small portions of the canvas of the roots. Also, no adjusting structure for the gauging device and the knives is required.

In the present invention the gauging structure comprises a pair of laterally opposed, endless gauging belts mounted above (instead of below) the lifter belts, with the gauging belts inclining upwardly from the lifter belts. The gauging belts grip the tops independently of the lifter belts at a transfer zone downstream of the knives, as the lifter belts continue their rearward transport of the tops and their depending roots. The gauging belts initially grasp the tops just above the gripping zone of the lifter belts, and since the plane of the gauging belts diverges upwardly and rearwardly from that of the lifter belts, the gauging belts exert an independent or auxiliary lifting force on the tops for gradually and progressively pulling the tops substantially perpendicularly through the lifter belts until the crowns of the depending roots are brought against the lower edges of the lifter belts. With this construction, there is no interference of the roots by the gauging belts before the roots reach the trimmer. This gauging action is completed before the roots reach the trimmer disposed below the lifter belts. As mentioned, the trimmer (preferably a pair of opposed rotary knives) is disposed beneath, parallel to and closely adjacent the lifter belts, downstream of the transfer zone. As noted, in prior harvesters, trimmer knives are disposed below the gauging devices.

As will be explained in detail presently, belt presser means are provided whereby the gripping force exerted by the gauging belt on the upper portions of the tops exceeds that exerted by the lifter belts on the lower portions of the tops thereby insuring that gauging belts can pull the tops substantially perpendicularly through the lifter belts to bring the crowns against these belts, as previously described.

The harvester of the present invention advances the crop through the knives even if the tops are short and presents no problem of the gauging device pulling the tops down and clear of lifter belts, as could occur in the Krier, Floeter et al. and Urschel patents. This is because in the present harvester, the lifter or harvesting belts always maintain their grip on the tops (long or short) adjacent the crowns of the roots, not only while the roots are being trimmed but right up to the zone of discharge of the tops to the ground after trimming. If the tops are so short that they clear the gauging belts after trimming, this is immaterial, because the lifter belts will continue to carry the short, trimmed tops rearwardly.

In order to maximize the yield, it is desirable to slice off the small upper section or crown of each root along a plane that is perpendicular to the axis of the root, and since in the present invention the trimming knives are close to and parallel to the inclined lifter belts, this means that axis of the root should be inclined from its initial vertical position to a position wherein the root axis is normal to the plane of the lifter belts. Under the present invention, this is accomplished by driving the gauging belts at a speed sufficiently slower than that of the lifter belts so that the gauging belts retard rearward motion of the upper portions of the tops relative to the rearward motion of the portions of the tops adjacent the roots caused by the lifter belts. With this construction, the depending roots are swung rearwardly about the grip zone where the lower portions of the tops are gripped by the lifter belts. This brings the root axes into the desired inclined position, wherein these axes are substantially normal to the lifter or harvesting belts, before the roots reach the trimmer. Since the trimmer is disposed to trim in a plane parallel to and slightly below the lifter belts, the aforesaid swinging action, which brings the axes of the roots (e.g., carrots) perpendicular to the plane of the lifter belts, results in a "square" cut that is perpendicular to each root axis. Trimming the roots square and close to the lifter belts optimizes the yield by minimizing the yield loss in the roots that necessarily occurs when the trimmed tops are discharged back to the field.

As mentioned, where the two sets of belts are superimposed (at least up the the trimming knives), the grip of the gauging belts on the tops should exceed that of the lifter belts on the tops, to insure that the gauging belts will pull the tops up through the lifter belts to bring the crowns of the roots against the lifter belts. Belt presser means, such as the conventional series of spring loaded idlers are provided for the gripping reaches of both the harvesting and gauging belts. In order to provide the aforesaid differential gripping forces, the idler springs are adjusted so that the force exerted by the idlers on the gripping reaches of the gauging belts exceeds that exerted by the idlers on the underlying reaches of the lifter belts. This facilitates the aforesaid independent top pulling action of the gauging belts, whereby the tops are pulled up through the lifter belts until the crowns of the roots engage the lifter belts.

In a preferred embodiment of the invention, the angle of the inclination of the gauging belts to the lifter belts is about 6–7 degrees and the gauging belts are driven at a speed that is about 7% slower than that of the lifter belts to cause the aforesaid swinging action of the roots to bring their axes perpendicular to the plane of the lifter belts.

BRIEF DESCRIPTION OF THE DRAWINGS

FIG. 1 is a side elevation of a carrot harvester embodying the present invention with the protective shield broken away.

FIG. 2 is a partial plan view of the belt system taken on line 2—2 of FIG. 1.

FIG. 3 is an enlarged section through one of the lifter belt frame structure taken on line 3—3 of FIG. 2.

FIG. 4 is a section like FIG. 3 taken through one of the gauging belt frame structures.

FIG. 5 is a diagrammatic perspective showing the drive system of various elements with the belts which are normally in engagement but separated for clarity of illustration.

FIG. 6 is a rear view of the harvester.

FIG. 7 is a diagrammatic view like that of FIG. 1 showing the belts and their mode of operation.

DETAILED DESCRIPTION OF THE HARVESTER

As mentioned, the harvester H illustrated as embodying the invention is a one row carrot harvester designed to be pulled by a tractor and driven by a power takeoff from the tractor. However, the mode of operation of the belts and the principles of the present invention can be embodied in multi-row harvesters either tractor drawn or self-propelled.

FRAME STRUCTURE

In the form shown, the frame of the harvester includes longitudinal frame members 10,10a. These are seen in dotted lines in the rear view of FIG. 6 and in FIG. 1 the harvester has been broken away just inside of the right frame member 10. A front cross member 12 (FIG. 1) connects the longitudinal frame members 10,10a and a long cross beam 14 extends across rear intermediate portions of the longitudinal frame members as seen in FIGS. 1 and 6. The longitudinal frame members continue rearwardly of the long cross member 14 and are connected by a rear cross member 16 (FIG. 6). A pair of intermediate main frame support wheels W1,W2 (FIGS. 1 and 6) are rotatably mounted between the longitudinal frame members 10,10a. As best seen in FIG. 6 in order to prevent overturning of the harvester by the weight of a discharge conveyor, an outboard wheel W3 is mounted at the outer end of the long cross beam 14.

Near the rear of the main frame is a vertical U-shaped structure comprising vertical channels 18 and 20 (FIG. 6) connected by an upper channel 22, the channel 22 appearing in the section of FIG. 1. This U-shaped structure projects upwardly from the longitudinal frame members 10,10a. In order to pivotally support a lifter frame assembly indicated generally at LF, the frame includes a vertical post 24 (FIG. 1) that projects upwardly from the rear cross member 16 and is centered between the wheels W1, W2. The frame also includes an upwardly projecting bracket 26 (FIG. 1) ahead of the wheels W1,W2 for supporting structure for raising and lowering of the lifter frame assembly LF. An operator's seat 28 mounted on a platform 30 supported on channel 20 is provided for an operator in order that he may operate a lever 32 for raising and lowering the lifting frame assembly, as well as controls not shown for raising and lowering a plow P.

PLOW

The plowshare 36 of plow P is mounted on a curved arm 38 which connects to a forwardly projecting arm 39 that is pivoted to the main frame at 40 in the midplane of the lifter plane assembly LF. In order to raise and lower the plow, the forwardly projecting arm 39 has an upstanding bracket 42, and a link 44 which is pivoted to the bracket 42 at 45 and at 46 to an operating lever 48, the lower end of which is pivoted at 50 to structure on the main frame. The lever 48 is advanced and retracted to raise and lower the plow by a piston and cylinder assembly 52, the cylinder being pivoted at 54 to a bracket 55 depending from frame structure and the piston is pivoted at 56 to the mid portion of the lever 48. The piston 52 is in its retracted position in FIG. 1 which lowers the plow to its operating position for loosening the crop. Advance of the piston pivots the lever 48 to the left, as seen in FIG. 1, which through the linkage 44 and the upstanding bracket 42 pivoted thereto will raise the plow clear of the ground for transportation of the harvester. The harvester is pulled along the ground by a draw bar 60 connected to a tractor and is powered in a manner to be explained presently by a power takeoff shaft 62 which drives into a gear box 64 supported on the frame.

LIFTER FRAME ASSEMBLY

The lifter frame assembly LF mounts paired lifter belts B1,B2 which grasp the tops of the roots and transports them rearwardly as well as elevating them. The lifter frame assembly also mounts gauging belts G1,G2 which are upwardly and rearwardly inclined at an acute angle to the lifter belts, so as to diverge from the lifter belts, as best seen in FIG. 1 and the diagram of FIG. 7. The frame work for the lifter frame assembly is formed up of longitudinal channel structures, the forward ends of which mount gathering points GP and which also serve to mount pulleys for the belts, drive structure for the pulleys, the trimming knives, as well as providing a rear pivotal mounting for the entire lifter frame assembly on the main frame of the harvester. These frames also mount various idler pulleys for urging the rearwardly running reaches of the lifter engaging belts towards one another for grasping the tops or foliage of the crop.

The framework of the lifter frame assembly includes parallel, right and left longitudinally extending channel structures, one for each set of belts. Since these channel structures are mirror images of one another, only one will be described in detail.

Referring to FIG. 1–4, the channel structures for the left belts B1,G1 will be described. Extending upwardly and rearwardly from the associated gathering point GP is an inverted U-shaped channel 70 which is parallel to the associated lifter belt B1. In order to support the gauging belt G1, a U-shaped channel 72 diverges from channel 70 in the vicinity of the frame bracket 26 previously described. The junction of channels 70,72 is reinforced by fish plates 74 welded to the channels 70, 72 as best seen in FIGS. 1 and 3.

In the lifting frame assembly shown, the framework for mounting the lifter belts B1,B2 includes the section 70 previously mentioned and a continuation 70a of that section seen in FIG. 1. The continuation section 70a is parallel to the lifter belt B1. Its forward end is connected to the channel 72 by spaced brackets 81,82 seen in FIGS. 1 and 2. The longitudinal channels 70 for each lifter belt B1,B2 are joined at their lower front ends by an arch 84 (FIG. 1) and the longitudinal extension channels 70a are joined at their upper rear ends by transverse bars 86 (FIG. 1). The gauging belt channels 72 are joined at their upper rear ends by a transverse bar 87 (FIG. 2) and the vertical spacing of the rear ends of the gauging belt channels from the rear ends of the lifter belt channel extension 70a is maintained by vertical brackets 88 extending between bars 86 and 87.

In order to mount belt idler pulleys, the lifter belt channels 70,70a are provided with opposed inwardly projecting pivot flanges 90 (FIG. 3). On the other side the channels are provided with notched spring retainer flanges 92. Similar idler mounting flanges 96 are provided on the gauging belt channels 72 and idler spring retainer flanges 98 are likewise provided on these channels (FIG. 2).

In order to pivotally mount the lifter frame assembly LF on the harvester frame (FIG. 1) a cross channel 102 is welded to the rear ends of channels 70a. The cross channel also supports a gear box. The cross channel 102 is pivotally mounted at 106 on an inclined arm 108 secured to the upper end of the vertical frame post 24, previously described. The elevation of the lifter frame assembly LF is controlled by operation of the hand lever 32, previously mentioned. This lever is pivoted to the frame at 110 (FIG. 1) and its pivot shaft mounts a rock lever 112. The lever 112 is connected by means of a chain 114 to one arm 116 of a belt crank pivoted on the frame bracket 26 at 118. The other arm 120 of the belt crank connects to one end of a chain 122, the other end of which connects to a cross piece 123 extending across the gauging belt frame members 72. The weight of the lifting frame is partially counterbalanced by a spring 124, one end of which is connected to a rear portion of the frame and the other end of which is connected by means of a chain 126 connected to the rock lever 112.

PULLEYS

The lifter frame assembly mounts driven and idler pulleys for the lifter and gathering belts. The design of the bearing mountings for the shafts of these pulleys represent mere engineering and hence are not illustrated in detail. The same remarks apply to the mounting of other shafts employed in the belt driving system for the lifter frame assembly.

Referring to FIGS. 1 and 2 and the schematic diagram of FIG. 5, the lifter belts B1,B2 have lower idler pulleys 130,132 mounted on the associated frame channels 70. The lifter belts B1,B2 also have driving pulleys 134,136 at their rearward ends mounted on the frame channel extensions 70a.

The gauging belts G1,G2 have forward idler pulleys 138, 140 mounted on the diverging longitudinal channels 72. The gathering belts are provided with rear drive pulleys 142,144 mounted on shafts supported at the rear ends of the gathering belt channels 72.

The opposed, rearwardly running reaches of the lifter belts B1,B2 and the gauging belts G1,G2 are resiliently pressed together in order to grip the tops of the plants. This action is provided by a series of spring loaded idlers spaced along the aforesaid reaches of the belts. The idlers are mounted on spring loaded, pivoted levers and the only difference between the idlers for the lifter belts and those for the gauging belts is that the spring loading of the latter is higher than that for the idlers on the lifter belts, for the reasons explained in the introductory remarks.

Referring to FIGS. 2–4, the mounting of the two sets of idlers is illustrated. All of the ilder pulleys are the same and are indicated at 150 for the lifter belt idlers and 152 for the gauging belt idlers.

The idlers 150,152 are pivotally mounted at the ends of levers 156,158, these levers being of identical construction. For example, as seen in FIG. 4, the levers 158 for the gauging belt idlers 152 are pivotally mounted on the flanges 96 of the channels 72. The pivot for each lever 158 is provided by a bolt 160 extending through a hub 162 of the lever, the lower ends of the bolts being connected and braced by longitudinally extending straps 164, which are sectioned in FIG. 4. The outer arm 166 of each lever 158 mounts an idler 152 and the lever 166 has an oppositely projecting or inner arm 168 for mounting a tension spring. As mentioned, the construction of the idler arms 156 for the lifter belt idlers 150 is like that just described. The lever arms 156 for the lifter belt idlers 150 are spring loaded by springs 170 (FIG. 2). One end of the spring of each spring 170 connects to the inner spring arm 168 of the associated lever 156 and the other end is hooked into a notch 172 formed in the outer flanges 92 of the lifter frame channels 70 and 70a.

The idler arms 158 for the gauging belt idlers 152 are spring loaded by springs 174 (FIGS. 2 and 4) connected at one end to the spring arms 168 and hooked into a selected one of the three notches 176 formed in the outer flanges 98 of the gauging belt frame channels 72.

As previously mentioned, in accordance with the present invention, the gauging belts G1,G2 exert a greater pressing force on the tops than do the lifter belts B1,B2. The purpose of this action is to enable the guaging belts to pull the tops or foliage up through the lifter belts until the roots engage the lifter belts. The ability to increase the tension of the gauging belt idler springs 174 is provided by the aforesaid notched spring mounting.

As seen in FIG. 2, the springs 174 for the gauging belt idler 172 are placed in one of the notches 176 such that the springs 174 are under a greater tension than the corresponding springs 170 for the lifter belt idlers 150.

Referring to FIG. 2, it will be noted that opposed lifter belt idlers 150 are staggered, although only a few of these idlers appear in the figure. However, at the entrance to the gauging belts G1,G2, the lifter belt idlers 150a are disposed directly opposite one another and this construction also applies to the next set of lifter belt idlers (not shown), the remainder of the set being staggered as indicated at the left of FIG. 2. Also, as seen in FIG. 2, the first set of opposed gauging belt idlers 15a are directly opposite one another whereas in the remaining idlers, the gauging belt idlers 152 are staggered along the length of the gathering belts.

CONVEYOR CONSTRUCTION

The construction of the conveyor system for receiving the roots and delivering them to a vehicle alongside the harvester is not critical to the present invention and will only be described briefly.

As best seen in FIG. 7, the tops f are trimmed from the roots r by opposed, overlapping trimming knives T and the trimmed roots drop onto downwardly inclined, rotating conveyor rollers 180, beneath the knives. As seen in FIG. 1, the rollers 180 are mounted beneath a chute 182 and their upper or left ends are geared together by gears 184 external to the box chute 182. One of the rollers is driven by a hydraulic motor 186 which drives them all through the aforesaid gears. The rear view of this construction also appears in FIG. 6.

As seen in FIG. 6, the conveyor system includes an elevator conveyor indicated generally at C and having main frame 190, having lower side plates 191 which are pivoted at 192 from brackets 193 depending from the frame work cross pieces 14,16 of the harvester H. The conveyor frame is indicated in its crop delivering position in FIG. 6 and is held in that position by a link 194 connected to the main frame channel 22 at 196 and to the conveyor frame at 198. The conveyor includes an endless, flexible belt 200 having upstanding flights 202. The lower end of the belt passes around an idler roller 204 which is positioned so that the belt will receive roots r from the previously described rollers 180. The upper end of the belt 200 is driven by a drive roller (not shown) and a hydraulic motor 206 connected to the hydraulic system of the harvester in a conventional manner. The usual controls (not shown) for the motor 206 are available to the operator seated in the seat 28 just described. The trailer or other vehicle for receiving roots dropped from the upper end of the conveyor belt 200 is not shown in FIG. 6.

DRIVES

The drives for the various elements previously described are shown schematically and in diagrammatic form in the perspective view of FIG. 5. As mentioned, the elements are driven by a shaft 62 connected to the power takeoff (not shown) of the tractor that draws the harvester along the field. The speed of the power takeoff is synchronized with the ground speed of the tractor in the usual manner. The power takeoff shaft 62 drives a remotely controlled clutch 210, the details of which are not critical to the present invention. This clutch can be either mechanically or electrically controlled by the operator and is disposed in the gearbox (FIG. 1) previously described. The clutch drives a chain 212 which is turn drives a sprocket 214 connected to the main drive shaft 216 of the driving system. The rear end of the shaft 216 drives a sprocket 218, a chain 220 and a sprocket 222 which drives a right angled gear box 224 mounted on the main frame (FIG. 1).

The output shaft of the gear box 224 mounts a drive sprocket 226 for a chain 228 and a driven sprocket 230. The direction of rotation of various elements being described is indicated by arrows in FIG. 5. The sprocket 230 drives a short cross shaft 232 which is supported in bearings in a fixed frame plate, the details of which are not critical to the invention. The cross shaft 232 drives a small sprocket 234 and a chain 236 tightened by an idler 238 (see also FIG. 1). The chain 236 drives the input sprocket 240 of a right hand angle gear box 104a which gear box is provided for driving the elements, such as the right hand lifter belts B2, etc. The gear box 104a drives the left hand gear box 104 previously described by a cross shaft 242, which is broken away in FIG. 5.

The left hand gear box 104 has a generally vertical output shaft 244 which rotates in the direction indicated by the arrow on the shaft sprocket 246. The right hand gear box output shaft 244a drives a sprocket 246a in the opposite direction from the direction of rotation of the sprocket 246. Thus, the drives to the two sides of the lifter frame assembly are identically arranged but the various sprockets and pulleys thereof rotate in oppposite directions in order that the gripping reaches of the lifter belts B1,B2 and the gauging belts G1,G2 move rearwardly in the same direction and at the same speed.

For example, referring to the left hand sprocket 246, previously described, it drives a chain 248, an upper sprocket 250 and the shaft 251 for the left hand trimming knife T. The shaft 251 is mounted for rotation in the frame member 70a. The right hand trimming knife T is driven by a chain 248a, sprocket 250a and a shaft 251a.

In order to drive the driving pulley 134 for the left hand lifter belt B1, the vertical shaft 244 of the left gear box 104, previously described, also drives a lower sprocket 252, a chain 253 and a sprocket 254 on a shaft 256 for the drive pulley 134. Corresponding drive structure for the drive pulley 136 that drives the right hand lifter belt B2 is given the same reference characters followed by the letter "a."

In order to drive the drive pulley 142 for the left hand gathering belt G1, the left hand gear box shaft 244 connects by means of a universal joint 260 to an extension shaft 262. The latter shaft drives a sprocket 264, a chain 266, and a sprocket 268 and the shaft 270 for the pulley 142. The pulley 144 for the right hand gauging belt G2 is driven by corresponding structure.

The speed of the power take off shaft 62 that drives the entire mechanism just described is proportional to the ground speed of the tractor (about 3–5 mph). The drive ratios are such that the gripping reaches of the lifter belts B1,B2 move rearwardly at a speed approximately equal to the ground speed of the tractor that pulls the harvester H.

In order that the gauging belts will cause the axis of the roots to be perpendicular to the plane of the lifter belts during trimming, the gearing of the drive structure just described is such that the gauging belts G1, G2 are driven at a speed that is approximately 7% slower than that of the lifter belts B1,B2. As previously mentioned, the gauging belts are inclined upwardly and rearwardly relative to the lifter belts. In the embodiment described, the inclination angle "d" (FIGS. 1 and 7) is in the order of 6°–7°.

OPERATION

The operation of the harvester H of the present invention, when employed for harvesting a crop of carrots planted in rows, will be explained in connection with the schematic diagram of FIG. 7. Illustrated is a row of carrots having roots r having crowns from which grow the foliage f. As shown ahead of the harvester, the crowns of the roots r are not uniformly spaced relative to the ground level "g." Some of the roots project above the ground surface, some below it and some may be disposed at the ground surface. By way of example, the maximum variation in root position is indicated at "a."

As the plow P loosens the crop, the advancing harvester brings the lifter belts B1,B2 forward so that their entrance throats formed by the pulleys 130,132 (previously described) converge on the tops f, so that they can be grasped by the resiliently biased, rearwardly running reaches of the lifter belts B1,B2. The lifter belts convey the crop rearwardly relative to the harvester and as indicated in FIG. 7, due to the aforesaid variation "a" in the vertical position of the crowns of the roots, there is a corresponding variation "b" in the position of the crowns of the roots relative to the lower edges of the lifter belts. Due to the effect of gravity on the roots, the roots hang with their longitudinal axes substantially vertically disposed while their foliage is being transported solely by the lifter belts.

When the crop reaches the entrance throat of the gauging belt G1,G2, formed by the pulleys 138,140, the foliage or tops f are grasped by the rearwardly running reaches of the gauging belts. As will be recalled, the linear speed of the gauging belts is about 7% less than that of the lifter belts. Accordingly, the gauging belts progressively retard the rearward motion of the tops or foliage f relative to the rearward motion of the roots r. It will also be recalled that the gauging belts are inclined upwardly and rearwardly relative to the lifter belts by the angle "d" and that the idlers 152 for the gauging belts have a spring loading that exceeds that of the underlying idlers 150 of the lifter belts. Because of this construction, the gauging belts progressively pull the tops or foliage f upwardly through the lifter belts until the crowns of the roots are in engagement with the undersides of the rearwardly running reaches of the lifter belts. Furthermore, due to the aforesaid speed differential between the gauging and lifter belts, the retarding action of the gauging belts on the tops f causes the portions of the tops f, gripped by the faster moving lifter belts at the crowns of the roots r to advance rearwardly relative to the upper portions of the same tops that are grasped by the opposed reaches of the shower moving gauging belts. The aforesaid differential speed action causes the tops or foliage f to act as a somewhat flexible beam or lever arm so that before the roots r reach the trimming knives T, this action on the tops has swung the roots so that they no longer depend from the lifter belts with their axes vertical, but their axes are disposed along an inclined axis y—y which is perpendicular to the plane of the lifter belts B1,B2. With this disposition of the roots, it is apparent from FIG. 7 that the trimming knives T (which are disposed parallel to the lifter belts) will trim the roots along a trim line that is perpendicular to the root axes. The small upper crown portions r' off the root remain attached to the tops or foliage but since the trim line is perpendicular to the root axes and since the trimming knives are parallel to the plane of the lifter belts, the trimmed crown portions r' will have been trimmed square across the root axes and hence the loss of yield which might result if they were trimmed at an angle is eliminated. The yield loss is also reduced because the action of the gauging belts has brought the crowns of all the roots against the lifter belts which action, coupled with the fact that the trimming knives are disposed close to the lifter belts, minimizes the amount of loss represented by the crowns r' of the roots remaining attached to the tops.

It is also to be noticed that if the top f are long enough to be gripped by the gauging belts up to the point wherein the trimming knives perform their function, it is immaterial whether or not the tops are long enough to be grasped by the gauging belts thereafter. This action renders the trimming action relatively insensitive to the heights of the tops f.

Regardless of whether the tops are still gripped by both belts or only by the lifter belts, the tops f and the attached small upper crown portions "r'" are discharged from the rear ends of the lifter belts and fall back onto the ground through an open bottom sheet metal shield S which surrounds the rear of the harvester. The transfer action which occurs when the tops f are first grasped by the gauging belts G1,G2 takes place smoothly because the gauging belts are above the lifter belts and there are no impediments or obstructions to the free rearward motion of the roots r as they are conveyed back towards the trimming knives T.

Thus, the harvester of the present invention provides unimpeded conveying action of the roots to the trimming station, maximizes the yield by insuring that the roots are positioned against the lower surfaces of the lifter belts, further maximizes the yield by insuring that the trimming action is perpendicular to the axis of the roots and is not sensitive to occasional instances wherein the top or foliage f of a given root is somewhat shorter than the normal height of the tops. No adjustment of spring biased gauging arms or other mechanical constructions are required to produce the aforesaid optimization of yield. Jams do not occur and there is no need to stop the harvester to clear such jams as in the case of many prior devices which attempt to accomplish the results accomplished by the harvester of the present invention.

Although the best mode contemplated for carrying out the present invention has been herein shown and described, it will be apparent that modification and variation may be made without departing from what is regarded to be the subject matter of the invention as defined in the appended claims.

What is claimed is:

1. A field harvester and trimmer for root crops having foliage tops growing from the crowns of the roots, such as carrots, beets or the like, said harvester being of the type comprising a wheeled vehicle having a frame mounting a plow share for loosening the soil around the roots, a harvesting frame extending upwardly and rearwardly from the ground, said harvesting frame having a rearwardly extending, upwardly inclined lifter frame, two laterally opposed endless lifter belts in said lifter frame having adjacent reaches extending from the plow share to the rear of the harvester for grasping and lifting the tops of the plants, means for driving said lifter belts, trimming means at an upper rearward portion of said harvesting frame for topping the roots, and means for collecting the topped roots; the improvement wherein said lifter belt frame has a gauging belt frame diverging upwardly and rearwardly from an intermediate portion of said lifter belt frame, laterally opposed gauging belts mounted on said gauging belt frame and disposed above rearward portions of said lifter belts, said gauging belts extending upwardly and rearwardly from said lifter belts at an acute angle to and above said lifter belts for grasping the root crop tops and progressively pulling the tops up through the lifter belts to bring the crowns of the roots against the undersides of said lifter belts, said lifter belts having continuous unobstructed under surfaces up to said trimming means, said trimming means comprising knife means disposed below, substantially parallel to and closely adjacent to said lifter belts for slicing off the crowns of the roots, and means for driving said lifter and gauging belts.

2. The harvester of claim 1, wherein said gauging belts intersect said lifter belts at a zone that is substantially upstream of the lower ends of the lifter belts.

3. The harvester of claim 1, comprising presser means mounted on said lifter and gauging belt frames, resilient means connected between said frames and their associated presser means to load the presser means for urging the tops gripping reaches of said lifter and gauging belts together, and means for causing the resilient loading on the presser means for the gripping reaches of said gauging belts to exceed the resilient loading on the presser means for the underlying reaches of said lifter belts to facilitate the pulling action of said gauging belts on the tops of the crop.

4. A field harvester and trimmer for root crops such as carrots, beets or the like, said harvester being of the type comprising a wheeled vehicle having a frame mounting a plow share for loosening the soil around the roots, a harvesting frame extending upwardly and rearwardly from the ground, two laterally opposed endless lifter belts in said harvesting frame having adjacent reaches extending from said plow share to the rear of the harvester for grasping and lifting the tops of the plants, said lifter belts having continuous unobstructed under surfaces from front to rear, means for driving said lifter belts, trimming means at an upper rearward portion of said harvesting frame for topping the roots, and means for collecting the topped roots; the improvement comprising a gauging belt frame diverging upwardly and rearwardly from said harvesting frame, laterally opposed gauging belts mounted on said gauging belt frame and disposed above said lifter belts, said gauging belts being upwardly and rearwardly inclined at an acute angle to said lifter belts for grasping and pulling the tops of the crop up through the lifter belts to bring the crowns of the roots against the underside of said lifter belts, and means for driving said gauging belts at a speed sufficiently slower than that of said lifter belts for causing the latter to retard advance of the upper portions of the foliage tops gripped by the gauging belts relative to the lower portions of the foliage tops gripped by the lifter belts to swing the roots rearwardly relative to the top portions gripped by the lifter belts until root axes are substantially normal to the lifter belts before the roots reach said trimming means, said trimming means comprising knife means disposed below, substantially parallel to and closely adjacent to said lifter belts.

5. The harvester of claim 4, wherein said gauging belts intersect said harvesting belts at a zone that is substantially upstream of the lower ends of the lifter belts, a series of opposed spring loaded lifter belt idlers, means for mounting said idlers along said harvesting frame for engaging the root top gripping reaches of said lifter belts, a series of opposed spring loaded gauging belt idlers, means for mounting said gauging belt idlers along the harvesting frame for engaging the root top gripping reaches of said gauging belts, and means for causing the spring loading of the gauging belt idlers to exceed that of the lifter belt idlers for facilitating the pulling of the root crop tops up through the lifter belts by the gauging belts.

6. The harvester of claim 4, wherein said gauging belts are driven at a speed that is about 7% slower than that of said lifter belts for retarding advance of the portions of the foliage tops gripped by the gauging belts relative to those portions gripped by the lifter belts sufficiently to swing the roots through an angle that brings the root axes substantially normal to the lifter belts so that said knife means trims off the crowns in a plane substantially normal to the root axes.

7. The harvester of claim 6, wherein said acute angle between said gauging belts and said lifter belts is about 6–7 degrees.

* * * * *